United States Patent [19]

Michael

[11] 3,772,043

[45] Nov. 13, 1973

[54] CERMET PROTECTIVE COATING GLASS FRIT

[75] Inventor: Harold J. Michael, Columbus, Ohio

[73] Assignee: Rockwell International Corporation, El Segundo, Calif.

[22] Filed: Sept. 1, 1971

[21] Appl. No.: 177,140

Related U.S. Application Data

[62] Division of Ser. No. 69,914, Sept. 4, 1970, Pat. No. 3,706,579.

[52] U.S. Cl. .................... 106/48, 106/54, 117/129
[51] Int. Cl. ........ C03c 5/00, C03c 3/08, C03c 7/00
[58] Field of Search ................................ 106/48, 54

[56] References Cited
UNITED STATES PATENTS

| | | | |
|---|---|---|---|
| 2,194,246 | 3/1940 | Oberlander et al. | 106/48 |
| 2,244,360 | 6/1941 | Gallup | 106/48 |
| 2,837,487 | 6/1958 | Hutter | 106/48 |
| 2,886,476 | 5/1959 | Dumesnil et al. | 106/48 |
| 2,898,236 | 8/1959 | Long et al. | 106/48 |
| 3,413,133 | 11/1968 | Staleg | 106/54 |

*Primary Examiner*—A. B. Curtis
*Assistant Examiner*—Mark Bell
*Attorney*—L. Lee Humphries et al.

[57] ABSTRACT

A novel protective coating composition for application to metals by firing in an oxidizing environment at a temperature in the general range of 1,250° F. to 1,600° F., and essentially consisting of aluminum, a special mill addition having both refractory compound and reducible compound constituents, and a special homogeneous glass frit, obtains improved resitance of the metals to weathering and to corrosion by alkaline or acid solution attack under atmospheric conditions.

6 Claims, No Drawings

CERMET PROTECTIVE COATING GLASS FRIT

CROSS-REFERENCES

This is a divisional application of Application for U.S. Pat. No. 69,914, filed Sept. 4, 1970, now U.S. Pat. No. 3,706,579 and assigned to the assignee of this application.

SUMMARY

The composition of this invention in slip form consists on a weight basis of approximately 25 to 55 parts powdered aluminum, approximately 20 to 50 parts special homogeneous glass frit, approximately 14 to 27 parts special mill addition having both refractory compound and reducible compound constituents, approximately 0 to 10 parts flux, and water vehicle with added buffering agent; the special homogeneous glass frit has a calculated oxide content on a 100 parts weight basis consisting of 25 to 50 parts boric oxide, 10 to 50 parts silicon dioxide, 10 to 20 parts alkali metal oxide selected from the group consisting of the oxides of lithium, potassium, and sodium, and 10 to 40 parts of oxide selected from the group consisting of the oxides of calcium, magnesium, and zinc. Such glass frit is characterized by the fact that upon re-firing to the coating firing temperature in the range of approximately 1,250° F. to 1,600° F., both an alkaline earth or zinc-modified boro-silicate type wetting glass system liquid phase and an alkali metal-modified boro-silicate type sealing glass system liquid phase of greater viscosity are advantageously provided in the composition. Because of the prescribed composition characteristics, the coating in slip form has a prolonged shelf life in comparison to known cermet protective coating slips.

DETAILED DESCRIPTION

The following general formulation identifies the principal constituents, and preferred amounts on a 100 parts by weight basis, of the ceramic protective coating of this invention:

COATING COMPOSITION

| Constituent | Range | Preferred Amount |
|---|---|---|
| Aluminum Powder | 25 – 55 | 40 |
| Special Homogeneous Glass Frit | 20 – 50 | 40 |
| Special Mill Addition | 14 – 27 | 15 |
| Flux | 0 – 10 | 5 |

In addition, water, a buffering agent such as boric acid, and often a suspension control agent such as urea (such agent being in addition to any refractory such as enameler's clay or bentonite included in the composition as part of the mill addition and functioning to provide a degree of suspension control) are combined into the composition in a conventional manner to develop a slip suitable for most spray or dip coating applications. Details regarding each of the principal constituents, and particularly the required special homogeneous glass frit and the special mill addition, are provided in the further portions of the detailed description which follows.

Adjustments may be made to the composition formulation within the ranges indicated to vary the degree of resistance to weathering and corrosion attack that is obtained for metals coated by the composition. The preferred amounts given above relate to a composition that is fired to maturity at approximately 1,500° F. and that obtains improved protection of the coated metal against attack by most acid or alkaline solutions such as are encountered under atmospheric conditions involving chemical process or combustion exhausts, salt spray environments, high-humidity concrete curing environments, and the like. In instances wherein only general resistance to weathering is required, formulation modifications may be effected through minor modification of the aluminum powder to special homogeneous glass frit constituent ratio and also by variation of the special mill addition as hereinafter described.

ALUMINUM POWDER CONSTITUENT

The composition of this invention utilizes atomized aluminum metal powder in the preferred amount and quantities previously indicated. The aluminum powder preferably has a maximum particle size of approximately 74 microns (200 mesh). Aluminum metal powder used in the practice of this invention and meeting the above-stated −200 mesh requirement is readily available from established commercial sources.

SPECIAL HOMOGENEOUS GLASS FRIT CONSTITUENT

Of the composition constituents identified above, the special homogeneous glass frit ingredient is considered to be the most critical in nature since it must necessarily provide both a wetting glass system liquid phase and a sealing glass system liquid phase of greater viscosity upon subsequent re-firing at the composition firing temperature. A general oxide content formulation for a representative special homogeneous glass frit of the type required for the instant invention on a 100 parts by weight basis is as follows:

GLASS FRIT COMPOSITION

| Oxide | Range | Preferred Amount |
|---|---|---|
| Boric Oxide | 25 – 50 | 33.5 |
| Silicon Dioxide | 10 – 50 | 38.3 |
| Alkali Metal Oxide | 10 – 20 | 14.8 |
| Alkaline Earth Oxide, Zinc Oxide | 10 – 40 | 13.4 |
| TOTAL | | 100.0 |

The alkali metal oxide ingredient of the homogeneous glass frit is selected from the group consisting of the oxides of lithium, potassium, and sodium with sodium oxide normally being preferred. The alkaline earth oxides are selected from the group consisting of the oxides of calcium and magnesium and may be substituted for or used instead of zinc oxide depending upon particular shelf-life or corrosion resistance characteristics desired in the final coating composition. Specifically, calcium oxide and magnesium oxide are preferred as the alkaline earth oxide ingredient over zinc oxide whenever the potential alkaline or acid corrosion of the base metal is comparatively severe. Such oxides also contribute to prolonged shelf-life of the composition in its slip formulation. Zinc oxide may be utilized in substitution for such alkaline earth oxides if slip shelf-life is not an important consideration and particularly if only resistance to general weathering is required. In any event, the special homogeneous glass frit of the invention develops a boro-silicate glass system for each of the wetting and sealing phases at the composition firing temperature. The sealing phase system is an alkali metal-boro-silicate glass in each instance. The wetting phase system also is boro-silicate glass system but it has an alkaline earth oxide or zinc oxide glass network modifier depending upon the objective to be attained by the frit ingredients actually used.

Three specific examples of the homogeneous glass frit constituent used in the practice of this invention are given in the following Examples I through III formulations:

EXAMPLE I

| Oxide | Range | Preferred Amount |
|---|---|---|
| Boric Oxide | 25 – 50 | 33.5 |
| Silicon Dioxide | 10 – 50 | 38.3 |
| Calcium Oxide | 10 – 40 | 13.4 |
| Sodium Oxide | 10 – 20 | 14.8 |
| TOTAL | | 100.0 |

EXAMPLE II

| Oxide | Range | Preferred Amount |
|---|---|---|
| Boric Oxide | 25 – 50 | 33.6 |
| Silicon Dioxide | 10 – 50 | 29.4 |
| Zinc Oxide | 10 – 40 | 18.5 |
| Sodium Oxide | 10 – 20 | 18.5 |
| TOTAL | | 100.0 |

EXAMPLE III

| Oxide | Range | Preferred Amount |
|---|---|---|
| Boric Oxide | 25 – 50 | 31.0 |
| Silicon Dioxide | 10 – 50 | 35.0 |
| Zinc Oxide | 10 – 40 | 17.0 |
| Sodium Oxide | 10 – 20 | 17.0 |
| TOTAL | | 100.0 |

It should be noted that each of the above homogeneous glass frits is essentially insoluble in water. The preferred oxide compositions given in Examples I through III above may be developed by conventionally smelting the batching constituents specified in the Example IV through Example VI formulations given below, respectively:

EXAMPLE IV

| Constituent | Preferred Amount |
|---|---|
| Anhydrous Borax | 48.3 |
| Calcium Silicate | 28.0 |
| Silicon Dioxide | 23.7 |
| TOTAL | 100.0 |

EXAMPLE V

| Constituent | Preferred Amount |
|---|---|
| Soda Ash | 6.0 |
| Anhydrous Borax | 47.4 |
| Zinc Oxide | 18.0 |
| Silica | 28.6 |
| TOTAL | 100.0 |

EXAMPLE VI

| Constituent | Preferred Amount |
|---|---|
| Soda Ash | 5.1 |
| Anhydrous Borax | 44.0 |
| Zinc Oxide | 16.7 |
| Silica | 34.2 |
| TOTAL | 100.0 |

The batching constituents are normally dry-blended in the prescribed amounts until thoroughly mixed and are then charged into a smelting furnace. Smelting of the batch constituents typically involves heating to a temperature in the range of from 2,000° F. to 2,100° F. until the glass is formed and fined. Afterwards, the fined glass is water-quenched or roller-quenched, dried, and normally powdered to a −200 mesh fineness.

As previously suggested, an important characteristic of the required homogeneous glass frit as employed in the cermet protective coating composition of this invention is that it have sufficient wetting and seal-forming properties at the composition firing temperature. Whether adequate wetting and seal-forming properties exist may be determined and controlled with reference to the procedure described in U. S. Pat. No. 3,203,815, issued in my name August 31, 1965. With respect to the two-liquid-phase glass frit of the above Example I, for instance, a "sealer" phase flow value of approximately 138 percent is obtained and also a less-viscous "wetter" phase flow value of approximately 156 percent exists. Generally, the fusion flow values for the two different phases of the frit should have a difference in the range of 10 to 22 percent. Also, it is important that the glass frit constituent of the composition be essentially free of halogen elements.

MILL ADDITION CONSTITUENTS

The refractory and reducible compound constituents employed in the mill addition of the cermet protective coating composition of this invention are provided in the slip along with the special homogeneous glass frit to develop a substantial degree of coating thermal endurance at elevated temperatures and also to develop the required reduction reaction that occurs upon firing. The refractory compound constituent of the mill addition is normally selected from the group consisting of the oxide of aluminum, the silicates of calcium and magnesium, bentonite, and conventional enameler's clay. The reduction constituent in the mill addition is selected from the groups consisting of the oxides of cobalt, titanium, zinc, and zirconium and the sulfides of antimony and cadmium, which reduce in the presence of molten aluminum at the coating firing temperature resulting in the formation of intermetallic compounds that develop the desired corrosion-resistance characteristic. It should be noted that the use of titanium dioxide as the reducible compound ingredient of the mill addition is particularly advantageous in instances where it is required that the coated metal develop improved resistance to corrosion attack by acid or alkaline solutions at essentially atmospheric conditions.

FLUX CONSTITUENT

To the extent that use of a flux is desired to improve the bond of the cermet protective coating of this invention to the coated metal, lithium titanate is a preferred material. In the embodiment of the coating composition given in connection with Example VII below, the amount of flux utilized is 5 parts by weight of lithium titanate. In the Example VIII and Example IX cermet protective coating compositions, a flux addition has been omitted without adversely affecting resistance properties of the coated workpiece or coating relative to general weathering. Generally, no more than 10 parts by weight of flux such as lithium titanate is required for applications of the invention.

MINOR COMPOSITION CONSTITUTENTS

It is sometimes preferred that a conventional suspension control agent such as urea be utilized in the composition in addition to any enameler's clay or bentonite that is provided in the mill addition as a refractory but that also functions to control solids suspension in the slip. It further is important that boric acid or its functional equivalent be added to the water in the slip prepared for spray coating or other methods of application for purposes of buffering the mill liquor for prolonged periods such as two to three months of shelf life time. The parts by weight information given in the following Example VII through Example IX slip formulations are representative of the amounts of minor composition constituents normally used for purposes of developing a slip suitable for most spray coating applications.

COMPOSITION SLIP FORMULATIONS

A preferred embodiment of the coating composition of this invention in a slip formulation suitable for spray coating applications is detailed immediately below as Example VII. The amounts given for the various constituents are on a parts by weight basis.

EXAMPLE VII

| Constituent | Preferred Amount |
|---|---|
| Atomized Aluminum Metal Powder | 40.0 |
| Example I Special Homogeneous Glass Frit | 40.0 |
| Neutral Enameler's Clay Mill Addition | 6.0 |
| Bentonite Mill Addition | 1.0 |
| Titanium Dioxide Mill Addition | 8.0 |
| Lithium Titanate Flux | 5.0 |
| Urea | 0.25 |
| Boric Acid Buffering Agent | 2.0 |
| Tap Water | 50.0 |

The constituents listed above, excepting the aluminum metal powder and urea, are preferably first mixed in the prescribed proportions and ball milled for one hour. The milled slip, having a specific gravity of approximately 1.5, is then adjusted in acidity-alkalinity as necessary to a pH value in the range of 7.3 to 7.8 using a saturated aqueous solution of boric acid. The aluminum metal powder and urea are next added to the slip and mixed as by blunging. The resulting slip is normally suitable for application by conventional spraying techniques although further suspension control may be effected if necessary using sufficient electrolyte solution comprised of magnesium sulfate in tap water. As previously mentioned, the special homogeneous glass frit is usually powdered to at least a −200 mesh fineness.

The coating is fired to maturity in a conventional manner. It is necessary that the slip be dried completely after application to the metal to be protected and prior to firing and such may be accomplished by force-drying until all moisture is removed. Afterwards, the coated article is fired in an oxidizing atmosphere at 1,450° F. to 1,500° F. to maturity which is normally attained after a minimum of ten minutes at the desired temperature depending upon the metal mass. Cooling is accomplished in a normal room atmosphere and a final fired coating thickness of 3 to 5 mils is generally sufficient for good corrosion protection.

The coating composition derived from the principal constituents of the slip is particularly suitable for protecting metal that will possibly be subjected to corrosion by alkaline or acid solution attack under atmospheric conditions. The Example VII slip formulation also has excellent shelf life after preparation and prior to application.

The following Example VIII and Example IX slip formulations relate to variations of the coating composition of this invention that are satisfactory when general weathering is required and long slip shelf life is not necessary.

EXAMPLE VIII

| Constituent | Preferred Amount |
|---|---|
| Atomized Aluminum Metal Powder | 50.0 |
| Example II Special Homogeneous Glass Frit | 35.0 |
| Zinc Oxide Mill Addition | 5.0 |
| Cadmium Sulfide Mill Addition | 5.0 |
| Enameler's Clay Mill Addition | 5.0 |
| Bentonite Mill Addition | 1.0 |
| Urea | 0.5 |
| Boric Acid Buffering Agent | 1.5 |
| Tap Water | 50.0 |

EXAMPLE IX

| Constituent | Preferred Amount |
|---|---|
| Atomized Aluminum Metal Powder | 50.0 |
| Example III Special Homogeneous Glass Frit | 35.0 |
| Zinc Oxide Mill Addition | 10.0 |
| Cadmium Sulfide Mill Addition | 1.0 |
| Enameler's Clay Mill Addition | 5.0 |
| Bentonite Mill Addition | 1.0 |
| Urea | 0.5 |
| Boric Acid Buffering Agent | 1.5 |
| Tap Water | 50.0 |

The procedure that is preferred for preparing the above coating compositions into slip form for suitable spraying is the same as that set forth in connection with the Example VII formulation. The steps of application of the resulting slip to the to-be-protected metal and firing to maturity are also essentially identical. In most instances it is preferred that the metal to be coated using the composition of this invention be cleaned prior to application of the slip formulation either by acid pickling or sand blasting in a conventional manner.

The following Example X and Example XI slip formulations relate to further variations in the coating composition of this invention. Such variations are especially advantageous in coating applications respectively wherein increased resistance to corrosion under salt-spray weathering conditions is desired and wherein improved resistance to oxidation corrosion at temperatures to approximately 1,400° F. over prolonged periods is required. The Example X material also provides an excellent base for subsequently applied organic finishes utilized for effecting decorative color variations.

EXAMPLE X

| Constituent | Preferred Amount |
|---|---|
| Atomized Aluminum Metal Powder | 35.0 |
| Example I Special Homogeneous Glass Frit | 45.0 |
| Zirconium Oxide Mill Addition | 8.0 |
| Magnesium Silicate Mill Addition | 5.0 |
| Enameler's Clay Mill Addition | 6.0 |
| Bentonite Mill Addition | 1.0 |
| Urea | 0.25 |
| Boric Acid Buffering Agent | 2.0 |
| Tap Water | 55.0 |

EXAMPLE XI

| Constituent | Preferred Amount |
|---|---|
| Atomized Aluminum Metal Powder | 50.0 |
| Example I Special Homogeneous Glass Frit | 28.0 |
| Zirconium Oxide Mill Addition | 10.0 |
| Cobalt Oxide Mill Addition | 5.0 |
| Enameler's Clay Mill Addition | 6.0 |
| Bentonite Mill Addition | 1.0 |
| Urea | 0.25 |
| Boric Acid Buffering Agent | 2.0 |
| Tap Water | 55.0 |

The procedure preferred for preparing the above Example X and Example XI formulations is essentially the same as previously detailed in connection with the other example material formulations.

Panels of SAE 1010 low-carbon steel have been provided with the described protective coating composition in the manner indicated above and have been tested in both alkaline and acidic environments under room temperature conditions to establish that improved protection against corrosion attack is obtained for the base metal by practice of this invention. More specifically, SAE 1010 low-carbon steel sheet metal panels first coated with the material of Example VII as suggested and then subjected to the Gardner Impact Test at a 36 foot-pound test level, the PEI Deformation Adherence Test using an X-configured die, and a conventional 180° conical bend test, were each afterwards additionally subjected to prolonged exposure under standard salt spray, intermittent immersion, and high alkaline environment tests. The standard salt spray test involves a 5 percent sodium chloride solution and 100 percent humidity environment for 1,500 hours; the alkaline environment test involved a similar level of humidity using an alkali hydroxide solution with a pH value of 11 to 12. The intermittent immersion test involved a 3 percent sodium chloride solution with the panel being subjected to 10 minutes solution immersion each hour over a period of 1000 hours. Each of the previously deformed coated panels after the stated exposure evidenced no deterioration or attack in the underlying metal as determined by visual examination. Also, a similarly coated panel was subjected to etching by a 10 percent hydrochloric acid and 10 percent sulfuric acid solution for a total of 312 hours. The coated panel substrate evidenced a loss of thickness less than for Type 316L stainless steel subjected to the same exposure for the same period of time.

Two additional slip formulations having the composition of this invention are detailed in the following Example XII and Example XIII slips:

EXAMPLE XII

| Constituent | Preferred Amount |
|---|---|
| Atomized Aluminum Metal Powder | 35.0 |
| Example II Special Homogeneous Glass Frit | 45.0 |
| Zirconium Oxide | 8.0 |
| Magnesium Silicate Mill Addition | 5.0 |
| Enameler's Clay Mill Addition | 6.0 |
| Bentonite Mill Addition | 1.0 |
| Urea | 0.25 |
| Boric Acid Buffering Agent | 2.0 |
| Tap Water | 55.0 |

EXAMPLE XIII

| Constituent | Preferred Amount |
|---|---|
| Atomized Aluminum Metal Powder | 40.0 |
| Example I Special Homogeneous Glass Frit | 41.0 |
| Titanium Dioxide Mill Addition | 12.0 |
| Enameler's Clay Mill Addition | 6.0 |
| Bentonite Mill Addition | 1.0 |
| Urea | 0.25 |
| Boric Acid Buffering Agent | 2.0 |
| Tap Water | 55.0 |

It should be noted that the Example XII slip utilizes the homogeneous glass frit of Example II rather than the Example I frit identified in connection with the slip formulation of Example X. This particular substitution will result in a protective coating exhibiting greater resistance to weathering than the Example X formulation. The Example XIII slip formulation is similar to the composition set forth in connection with Example VII except that no fluxing agent is included.

I claim:

1. In a ceramic and metallic protective coating composition for application to metals at an ambient temperature and for subsequent maturing at a firing temperature in the range of approximately 1,250° F. to 1,600° F., an improved glass frit which at ambient temperature has a homogeneous quenched solid phase and at a subsequent temperature in the range of approximately 1,250° F. to 1,600° F. has two liquid phases, the first phase being a seal-forming boro-silicate glass system with an alkali metal glass network modifier from the group consisting of lithium, potassium, and sodium and the second phase being a less viscous wetting borosilicate glass system with a glass network modifier from the group consisting of calcium, magnesium, and zinc, said glass frit consisting of approximately 31.0 to 33.6 parts boric oxide, approximately 29.4 to 38.3 parts silicon dioxide, approximately 14.8 to 18.5 parts alkali metal oxide from the group consisting of the oxides of said alkali metal glass network modifiers, and approximately 13.4 to 18.5 parts alkaline earth oxide from the group consisting of the oxides of said calcium, magnesium, and zinc glass network modifiers on a 100 parts weight calculated oxide content basis.

2. The fritted glass defined by claim 1, consisting approximately of 33.5 parts by weight of boric oxide, 38.3 parts by weight of silicon dioxide, 14.8 parts by weight of sodium oxide, and 13.4 parts by weight of an alkaline earth oxide selected from the modifier group consisting of calcium oxide and magnesium oxide.

3. The fritted glass defined by claim 2, wherein said alkaline earth oxide from the group consisting of calcium oxide and magnesium oxide is calcium oxide.

4. The fritted glass defined by claim 1, wherein said alkaline earth oxide from the modifier group consisting of the oxides of calcium, magnesium, and zinc is zinc oxide, and wherein said alkali metal oxide from the modifier group consisting of the oxides of lithium, potassium, and sodium is sodium oxide.

5. The fritted glass defined by claim 1, consisting approximately of 33.6 parts by weight of boric oxide, 29.4 parts by weight of silicon dioxide, 18.5 parts by weight of zinc oxide, and 18.5 parts by weight of sodium oxide.

6. The fritted glass defined by claim 1, consisting approximately of 31.0 parts by weight of boric oxide, 35.0 parts by weight of silicon dioxide, 17.0 parts by weight of zinc oxide, and 17.0 parts by weight of sodium oxide.

* * * * *